(12) United States Patent
Yang et al.

(10) Patent No.: US 12,493,592 B2
(45) Date of Patent: Dec. 9, 2025

(54) CONSTRAINT RELATIONSHIP CHECK METHODS AND APPARATUSES FOR DATABASE

(71) Applicant: Beijing OceanBase Technology Co., Ltd., Beijing (CN)

(72) Inventors: Zhenkun Yang, Beijing (CN); Fusheng Han, Beijing (CN); Yuchen Wei, Beijing (CN); Fanyu Kong, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/891,633

(22) Filed: Sep. 20, 2024

(65) Prior Publication Data
US 2025/0013617 A1    Jan. 9, 2025

Related U.S. Application Data

(63) Continuation of application No. PCT/CN2023/085452, filed on Mar. 31, 2023.

(30) Foreign Application Priority Data

Apr. 2, 2022   (CN) .......................... 202210340354.5

(51) Int. Cl.
*G06F 16/21*    (2019.01)
(52) U.S. Cl.
CPC .......... *G06F 16/217* (2019.01); *G06F 16/219* (2019.01)
(58) Field of Classification Search
CPC .. G06F 16/217; G06F 16/219; G06F 16/2365; G06F 16/2282; G06F 16/284
See application file for complete search history.

(56) References Cited

U.S. PATENT DOCUMENTS 7,836,028 B1 *   11/2010   Agarwal ............. G06F 16/2477
                                                                707/798
10,216,820 B1 *   2/2019   Holenstein .......... G06F 16/1865
(Continued)

FOREIGN PATENT DOCUMENTS

CN          1645372 A       7/2005
CN        103714090 A       4/2014
(Continued)

OTHER PUBLICATIONS

International Preliminary Report on Patentability in International Appln. No. PCT /CN2023/085452, mailed on Oct. 17, 2024, 12 pages (with English translation).
(Continued)

*Primary Examiner* — Merilyn P Nguyen
(74) *Attorney, Agent, or Firm* — Fish & Richardson P.C.

(57) ABSTRACT

A computer-implemented method for a database constraint relationship check, includes performing a data manipulation language (DML) operation of a first transaction for a target data table in the database. A submission stage is entered. A corresponding current transaction version number is determined for a target data record obtained and each latest related data record visible to the first transaction is read from the target data table or an associated data table of the target data table. A mutual limitation relationship exists between field values corresponding to a target field in the target data record and each related data record. A constraint relationship check is performed on a target field value corresponding to the target field in the target data record based on each related data record. The first transaction is submitted if the constraint relationship check succeeds or the first transaction is rolled back otherwise.

20 Claims, 7 Drawing Sheets

(56) References Cited

U.S. PATENT DOCUMENTS

| | | | | |
|---|---|---|---|---|
| 12,001,314 | B2* | 6/2024 | Dickinson | G06F 16/2379 |
| 2016/0210316 | A1* | 7/2016 | Bendel | G06F 16/219 |
| 2019/0129986 | A1* | 5/2019 | Birn | G06F 16/2343 |
| 2022/0035652 | A1* | 2/2022 | Stamos | H04L 9/0637 |
| 2022/0171748 | A1* | 6/2022 | Bamel | G06F 11/1464 |
| 2023/0081900 | A1* | 3/2023 | Werner | G06F 16/2379 |
| | | | | 707/703 |

FOREIGN PATENT DOCUMENTS

| | | |
|---|---|---|
| CN | 104252382 A | 12/2014 |
| CN | 105868228 A | 8/2016 |
| CN | 107025257 A | 8/2017 |
| CN | 110019530 A | 7/2019 |
| CN | 110059115 A | 7/2019 |
| CN | 111259071 A | 6/2020 |
| CN | 114428774 A | 5/2022 |
| CN | 117076547 A | 11/2023 |
| WO | WO 2021073571 A1 | 4/2021 |

OTHER PUBLICATIONS

International Search Report and Written Opinion in International Appln. No. PCT /CN2023/085452, mailed on Jun. 25, 2 2023, 14 pages (with English translation).

* cited by examiner

| ID | Employee number | Occupation | Hobby | Department | Transaction version number | Pointer |
|---|---|---|---|---|---|---|
| 1 | 001 | Architectural engineer | Sing | Research and development department | 3 | 0x6546123 |

| ID | Employee number | Occupation | Hobby | Department | Transaction version number | Pointer |
|---|---|---|---|---|---|---|
| 1 | 001 | Middle programmer | Sing | Research and development department | 2 | 0x12446545 |

| ID | Employee number | Occupation | Hobby | Department | Transaction version number | Pointer |
|---|---|---|---|---|---|---|
| 1 | 001 | Junior programmer | Sing | Research and development department | 1 | Null |

| Employee number | Occupation | Hobby | Department | Transaction version number | ... |
|---|---|---|---|---|---|
| 001 | Programmer | Sing | Research and development department | 1 | ... |
| 002 | Architectural engineer | Dance | Research and development department | 1 | ... |
| 003 | Test engineer | Draw | Test department | 1 | ... |

FIG. 3a

| Employee number | Occupation | Hobby | Department | ... |
|---|---|---|---|---|
| 004 | Junior programmer | Sports | Research and development department | ... |

FIG. 3b

| Employee number | Occupation | Hobby | Department | ... |
|---|---|---|---|---|
| 002 | Project manager | Dance | Research and development department | ... |

FIG. 3c

| Employee number | Nickname |
|---|---|
| 001 | Jane |
| 002 | Janie |
| 003 | Anne |
| 004 | Daisy |

FIG. 3d

| Employee number | Occupation | Hobby | Department | Transaction version number | ... |
|---|---|---|---|---|---|
| 001 | Programmer | Sing | Research and development department | 1 | ... |
| 002 | Architectural engineer | Dance | Research and development department | 1 | ... |
| 003 | Test engineer | Draw | Test department | 1 | ... |

Match

| Employee number | Occupation | Hobby | Department | ... |
|---|---|---|---|---|
| 004 | Junior programmer | Sports | Research and development department | ... |

CONSTRAINT RELATIONSHIP CHECK METHODS AND APPARATUSES FOR DATABASE

CROSS-REFERENCE TO RELATED APPLICATIONS

This application is a continuation of PCT Application No. PCT/CN2023/085452, filed on Mar. 31, 2023, which claims priority to Chinese Patent Application No. 202210340354.5, filed on Apr. 2, 2022, and each application is hereby incorporated by reference in its entirety.

TECHNICAL FIELD

One or more embodiments of this specification relate to the database field, and in particular, to constraint relationship check methods and apparatuses for a database.

BACKGROUND

A general relational database provides a series of constraint definitions, to limit integrity of data in the database. To ensure that a constraint is not damaged, after an addition/deletion/modification operation is performed on the database, a constraint relationship check usually needs to be performed on a data record obtained after the addition/deletion/modification operation.

In a conventional technology, when the constraint relationship check is performed, a related data record is usually locked. For example, for a foreign key constraint, when a row of data record is added to a child table, a share lock needs to be added to a corresponding data record in a parent table and even the entire table, to prevent the parent table from being modified or deleted, thereby ensuring validity of the constraint relationship check. However, performance of the database is usually affected when a lock is added.

SUMMARY

One or more embodiments of this specification describe constraint relationship check methods and apparatuses for a database, to check a constraint relationship of the database without affecting performance of the database.

According to a first aspect, a constraint relationship check method for a database is provided, including: performing a data manipulation language (DML) operation of a first transaction for a target data table in the database, where each data record stored in each data table in the database has a transaction version number; entering a submission stage, and determining a corresponding current transaction version number for a target data record obtained after the DML operation in the submission stage; reading each latest related data record visible to the first transaction from the target data table or an associated data table of the target data table based on the current transaction version number, where there is a mutual limitation relationship between field values corresponding to a target field in the target data record and each related data record; performing a constraint relationship check on a target field value corresponding to the target field in the target data record based on each related data record; and submitting the first transaction if the constraint relationship check succeeds; or rolling back the first transaction otherwise.

According to a second aspect, a constraint relationship check apparatus for a database is provided, including: an execution unit, configured to perform a DML operation of a first transaction for a target data table in the database, where each data record stored in each data table in the database has a transaction version number; a determining unit, configured to: enter a submission stage, and determine a corresponding current transaction version number for a target data record obtained after the DML operation in the submission stage; a reading unit, configured to read each latest related data record visible to the first transaction from the target data table or an associated data table of the target data table based on the current transaction version number, where there is a mutual limitation relationship between field values corresponding to a target field in the target data record and each related data record; a check unit, configured to perform a constraint relationship check on a target field value corresponding to the target field in the target data record based on each related data record; and a processing unit, configured to: submit the first transaction if the constraint relationship check succeeds; or roll back the first transaction otherwise.

According to a third aspect, a computer storage medium is provided, the computer storage medium stores a computer program, and when the computer program is executed in a computer, the computer is enabled to perform the method according to the first aspect.

According to a fourth aspect, a computing device is provided, including a memory and a processor. The memory stores executable code, and when the processor executes the executable code, the method according to the first aspect is implemented.

One or more embodiments of this specification provide the constraint relationship check methods and apparatuses for a database. Each data record in the database has a transaction version number, and a value of the transaction version number indicates a sequence of submitting a transaction of operating the corresponding data record. After the DML operation is performed on the database, the latest related data record visible to a current transaction is selected for a constraint relationship check based on a currently determined transaction version number. Therefore, in this solution, validity of constraint relationship detection can be ensured without locking the related data record, to avoid affecting performance of the database.

BRIEF DESCRIPTION OF DRAWINGS

To describe the technical solutions in embodiments of this specification more clearly, the following briefly describes the accompanying drawings needed for describing the embodiments. Clearly, the accompanying drawings in the following description are merely some embodiments of this specification, and a person of ordinary skill in the art can still derive other drawings from these accompanying drawings without creative efforts.

DESCRIPTION OF EMBODIMENTS

The following describes the solutions provided in this specification with reference to the accompanying drawings.

As mentioned above, in a conventional technology, when a constraint relationship check is performed on a database, a related data record usually needs to be locked, to ensure validity of constraint relationship detection. This affects performance of the database.

The inventor of this application proposes to add a corresponding transaction version number for a data record in the database, to not affect performance of the database. Specifically, when a transaction is started to add or modify a row of data record, a corresponding transaction version number is determined for a newly added data record or a modified data record, and the transaction version number is added to the newly added data record or the modified data record. Then, the newly added (or modified) data record to which the transaction version number is added is stored in the database. A value of the transaction version number indicates a sequence of submitting a transaction of operating (including adding or modifying) the corresponding data record. Then, when the constraint relationship check is performed, a related data record visible to a current transaction is read based on a current transaction version number. Therefore, validity of the constraint relationship check on the database can be determined without affecting performance of the database.

It is worthwhile to note that when the modified data record is stored in the database, the modified data record does not overwrite a data record existing before modification; instead, both the data record existing before modification and the modified data record are retained. In other words, the same row of data record may have a plurality of versions, the plurality of versions respectively correspond to a plurality of modifications of the data record, the latest data record has a largest transaction version number, and the oldest data record has a smallest transaction version number.

Figure 1:
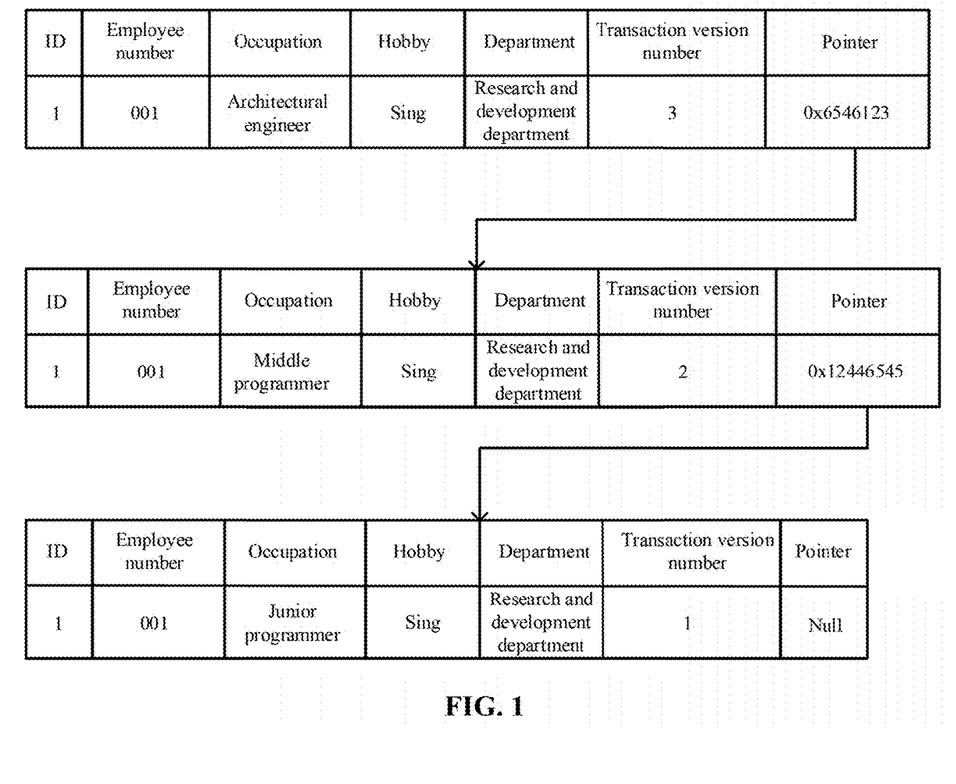
FIG. 1 is a schematic diagram illustrating a chained storage structure of a data record.

The plurality of versions of the same row of data record can be stored in a chained manner. In an example, a chained storage structure of the data record can be shown in FIG. 1. In FIG. 1, the oldest data record is located at the bottom (also referred to as a chain tail), and a corresponding transaction version number is 1. The latest data record is located at the top (also referred to as a chain head), and a corresponding transaction version number is 3.

It should be understood that, when the plurality of versions of the same data record are stored, if a specific transaction wants to read a row of data record that is being modified, a corresponding old version can be read, to avoid locking a related data record in a process of performing the constraint relationship check on the database. In addition, because the old version is not modified, correctness of the constraint relationship check is ensured.

FIG. 1 is used as an example. It is assumed that a specific transaction wants to read a data record corresponding to id=1, and a specific transaction is modifying the data record. In this case, the data record at the top of the chained storage structure can be read.

That is, in this solution, the corresponding transaction version number is added to the data record, to resolve a problem that performance of the database is affected because the data record needs to be locked. It is worthwhile to note that because the data record that is being modified is not successfully submitted, a valid data record is a data record in a previous version at a moment at which the transaction reads the modified data record. Therefore, a concept of reading an old version in this solution is correct.

In addition, the constraint relationship can include but is not limited to a not null constraint, a column check constraint, a column reference constraint (REF constraint), a unique constraint, a primary key constraint, and a foreign key constraint. The not null constraint indicates that a field value is forbidden to be modified to be null. The column check constraint indicates that a field value to be written to the database needs to satisfy a specified condition. The column reference constraint defines an application relationship of an object in the database. The unique constraint indicates that in a plurality of rows, the same field value is forbidden from existing in the same column or a plurality of column combinations but some field values are allowed to be null. The primary key constraint indicates that in a plurality of rows, the same field value is forbidden from existing in the same column or a plurality of column combinations and a field is forbidden from being null. The foreign key constraint indicates that a field value in one table needs to match a field value in another table.

It is worthwhile to note that checks on the first three constraint relationships only relate to a current row, checks on the primary key constraint and the unique constraint relate to all rows in a current table, and the foreign key constraint relates to a current row and all rows in a parent table or a child table. This specification describes in detail checks on the last three constraint relationships.

Figure 2:
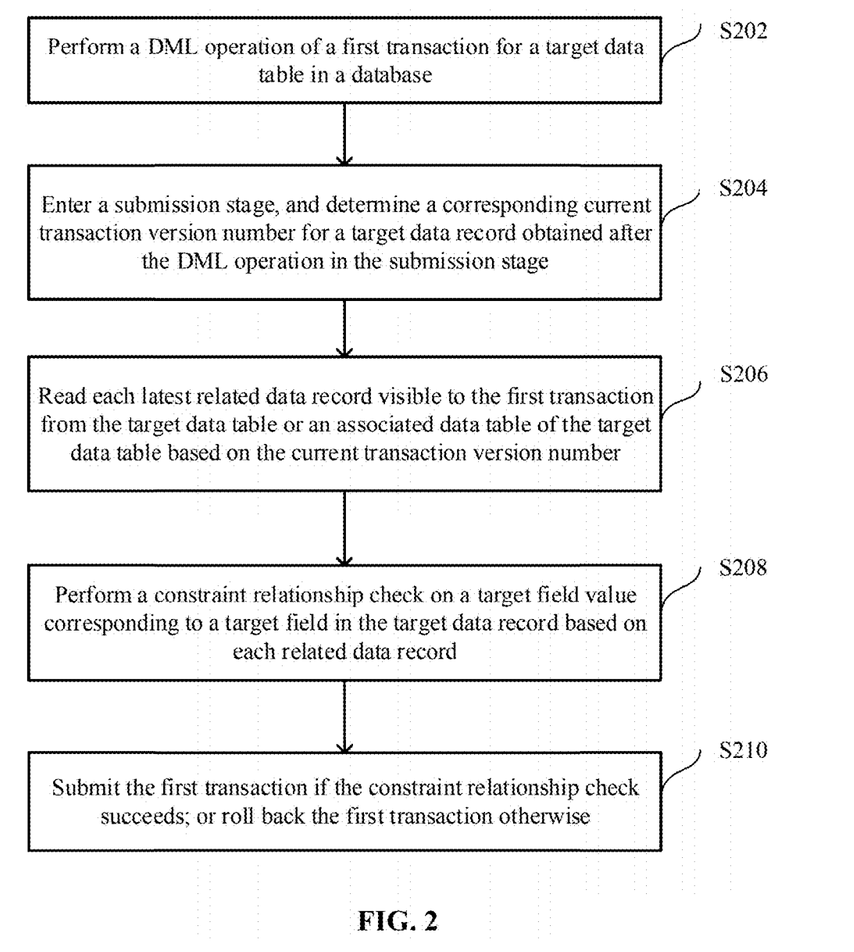
FIG. 2 is a flowchart illustrating a constraint relationship check method for a database, according to one or more embodiments.

FIG. 2 is a flowchart illustrating a constraint relationship check method for a database according to one or more embodiments. It can be understood that the method can be performed by any apparatus, device, platform, or device cluster that has computing and processing capabilities. As shown in FIG. 2, the method includes at least the following steps.

Step 202: Perform a data manipulation language (DML) operation of a first transaction for a target data table in the database.

Each data record stored in each data table in the database has a transaction version number.

The target data table includes at least a target field for which a constraint relationship is set. The DML operation can include one of the following: an addition operation, a modification operation, and a deletion operation.

Figure 3A:
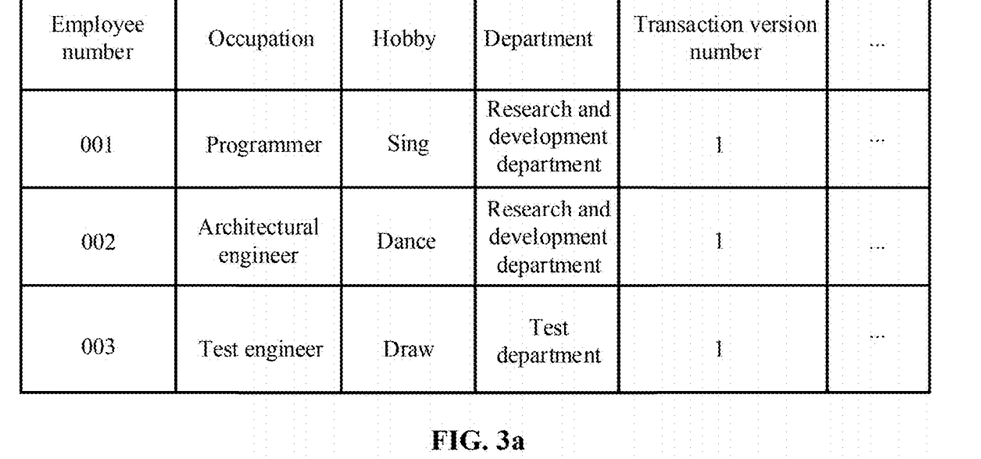
FIG. 3a is a schematic diagram illustrating a target data table.

In an example, the target data table can be shown in FIG. 3a. In FIG. 3a, a target data table s can include the following five fields: "employee number", "occupation", "hobby", "department", and "transaction version number". A constraint relationship is set for "employee number".

It should be understood that FIG. 3a is merely an example description. In actual applications, the target data table s can further include another field, and there also can be more than three rows of data records.

In FIG. 3a, the constraint relationship of the employee number has a corresponding check occasion. The check occasion can be an immediate check or can be a deferred check.

When the check occasion is the immediate check, before the submission stage is entered, a constraint relationship check is immediately performed on a target field value corresponding to a target field in a target data record obtained after the DML operation. For example, a constraint check is performed on a target field value of "employee number". For a specific check method, references can be made to the constraint check performed on the target field value after the submission stage is entered. Details are omitted for simplicity in this specification.

It should be understood that, the submission stage of the first transaction is entered if the constraint relationship check succeeds; or the first transaction is directly rolled back otherwise.

Step 204: Enter the submission stage, and determine a corresponding current transaction version number for a target data record obtained after the DML operation in the submission stage.

In this specification, a value of the transaction version number can indicate a sequence of submitting a transaction of operating the corresponding data record. In an example, a globally ordered transaction ID of the first transaction can be determined as the current transaction version number.

Figure 3B:
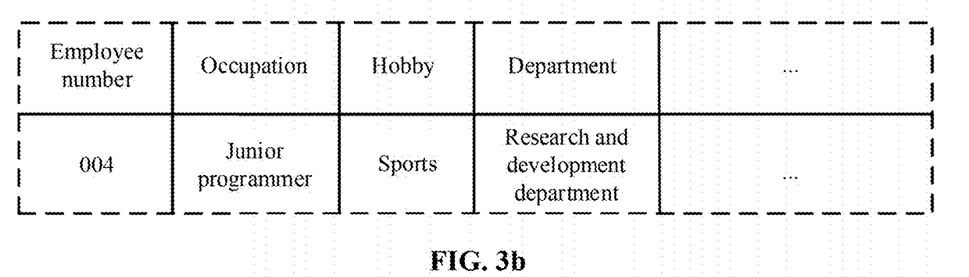
FIG. 3b is a schematic diagram illustrating a newly added target data record.
Figure 3C:
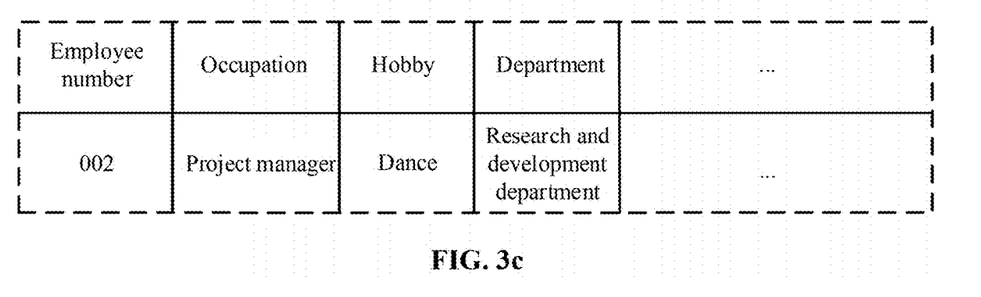
FIG. 3c is a schematic diagram illustrating a modified target data record.

For example, the DML operation is an addition operation. A newly added target data record can be shown in FIG. 3b. For another example, the DML operation is a modification operation. A modified target data record can be shown in FIG. 3c. In FIG. 3c, the target data record corresponds to the $2^{nd}$ row of data record in FIG. 3a.

In an example, if the transaction ID of the first transaction is 2, a current transaction version number of the newly added target data record or the modified target data record can be "2".

It is worthwhile to note that the target data records shown in FIG. 3b and FIG. 3c are merely temporary data. The target data record is either not written to a data area or has been written to a data area but needs to be marked with a special mark, so that the data record is ignored when the first transaction performs a read operation. It should be understood that the temporary data is actually written to the data area only after the first transaction is submitted.

Optionally, after the current transaction version number is determined, whether the target data table includes a field for which a constraint relationship is set can be determined. Step 206 is performed if the target data table includes a field for which a constraint relationship is set; or the first transaction is directly submitted otherwise.

Step 206: Read each latest related data record visible to the first transaction from the target data table or an associated data table of the target data table based on the current transaction version number.

There is a mutual limitation relationship between field values corresponding to the target field in the target data record and each related data record.

When the constraint relationship of the target field is a unique constraint or a primary key constraint, the reading each latest related data record visible to the first transaction includes: reading, from the target data table as each related data record, each latest data record whose corresponding transaction version number is less than or equal to the current transaction version number.

The target data records obtained after the DML operation that are shown in FIG. 3b and FIG. 3c are as an example. All three data records shown in FIG. 3a can be used as related data records.

It is worthwhile to note that checks on the unique constraint and the primary key constraint do not need to be performed for the deletion operation. To be specific, when the constraint relationship of the target field is a unique constraint or a primary key constraint and the DML operation of the first transaction is a deletion operation, the first transaction is directly submitted.

When the constraint relationship of the target field is a foreign key constraint, the reading each latest related data record visible to the first transaction includes: reading, from the associated data table of the target data table as each related data record, each latest data record whose corresponding transaction version number is less than or equal to the current transaction version number.

The associated data table is a child table of the target data table if the DML operation of the first transaction is a deletion operation; or the associated data table is a parent table of the target data table if the DML operation of the first transaction is an addition operation or a modification operation.

It is worthwhile to note that both the child table and the parent table are relative to the target field. The child table is a data table in which the target field is used as a foreign key, and the target field is a primary key of the target data table. The parent table is a data table in which the target field is used as a primary key, and the target field is a foreign key of the target data table.

Usually, when the target data table is a child table, a check on the foreign key constraint does not need to be performed for the deletion operation. When the target data table is a parent table, a check on the foreign key constraint does not need to be performed for the addition operation or the modification operation.

Figure 3D:
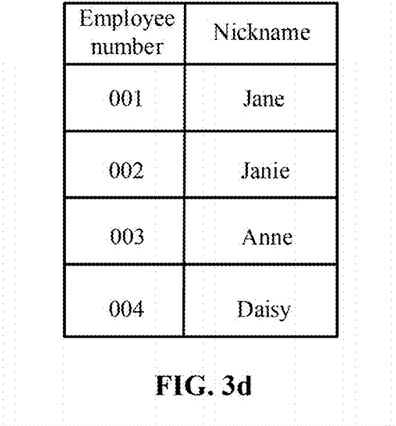
FIG. 3d is a schematic diagram illustrating a parent table of a target data table.

In an example, the parent table of the target data table can be shown in FIG. 3d. In FIG. 3d, "employee number" is a primary key.

The target data records obtained after the DML operation that are shown in FIG. 3b and FIG. 3c are as an example. All four data records shown in FIG. 3d can be used as related data records.

The following describes correctness of reading the related data record visible to the first transaction based on the current transaction version number.

As described above, in this specification, the value of the transaction version number is used to indicate the sequence of submitting the transaction of operating the corresponding data record. Specifically, the earlier submitted transaction corresponds to the smaller transaction version number, and the later submitted transaction corresponds to the larger transaction version number.

It should be understood that, when the above-mentioned definition is made, a data record whose corresponding transaction version number is less than or equal to the current transaction version number is a data record operated by a transaction submitted before the first transaction, and is visible to the first transaction. Therefore, the data record whose corresponding transaction version number is less than or equal to the current transaction version number can be read as a data record visible to the first transaction.

In addition, as described above, the same row of data record may have a plurality of versions. In this solution, the latest related data record is read, and a constraint relationship check is performed on the target field value. For example, for a specific related data record, when the related data record has a plurality of versions and related data records in the plurality of versions are stored in a chained structure, a related data record at a chain head can be read, and a constraint relationship check is performed on the target field value.

Step 208: Perform the constraint relationship check on the target field value corresponding to the target field in the target data record based on each related data record.

When the constraint relationship of the target field is a unique constraint or a primary key constraint, the performing the constraint relationship check on the target field value corresponding to the target field in the target data record includes: matching the target field value with each field value corresponding to the target field in each related data record in the target data table, where the constraint relationship check succeeds if matching with all the field values fails; or the constraint relationship check fails otherwise.

Figure 4A:
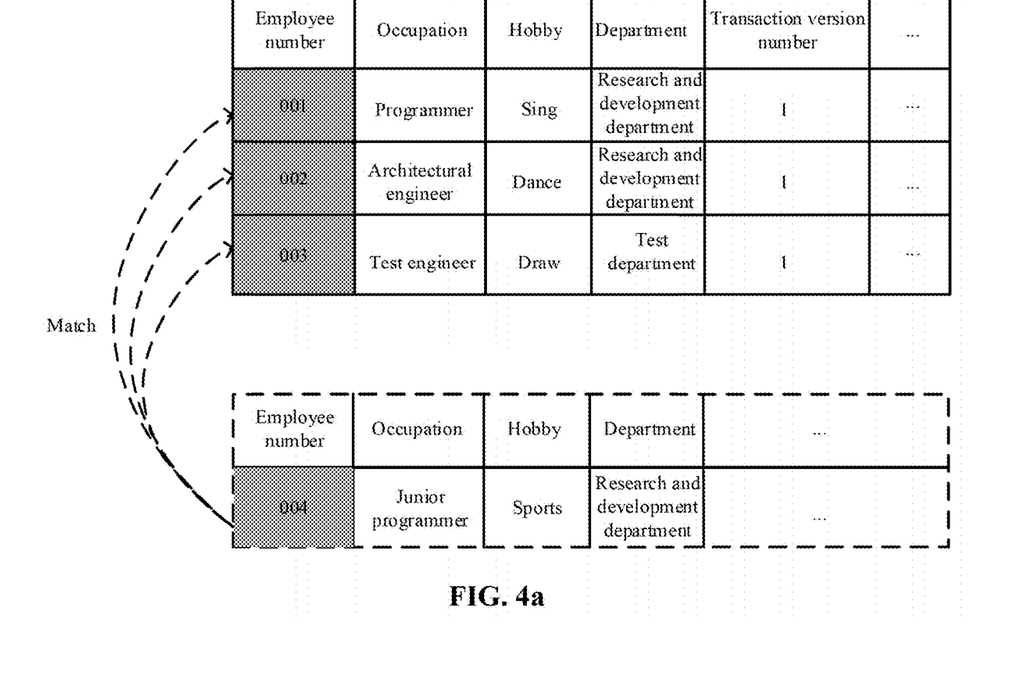
FIG. 4a is a schematic diagram 1 illustrating a matching process of a target field value.

The newly added target data record shown in FIG. 3b is used as an example. "Employee number" in the target data record can be matched with "employee number" in each of the three rows of data records shown in FIG. 3a in a one-to-one manner. A specific matching process can be shown in FIG. 4a. In FIG. 4a, the constraint relationship check succeeds because matching with "employee number" in all of the three rows of data records shown in FIG. 3a fails.

Figure 4B:
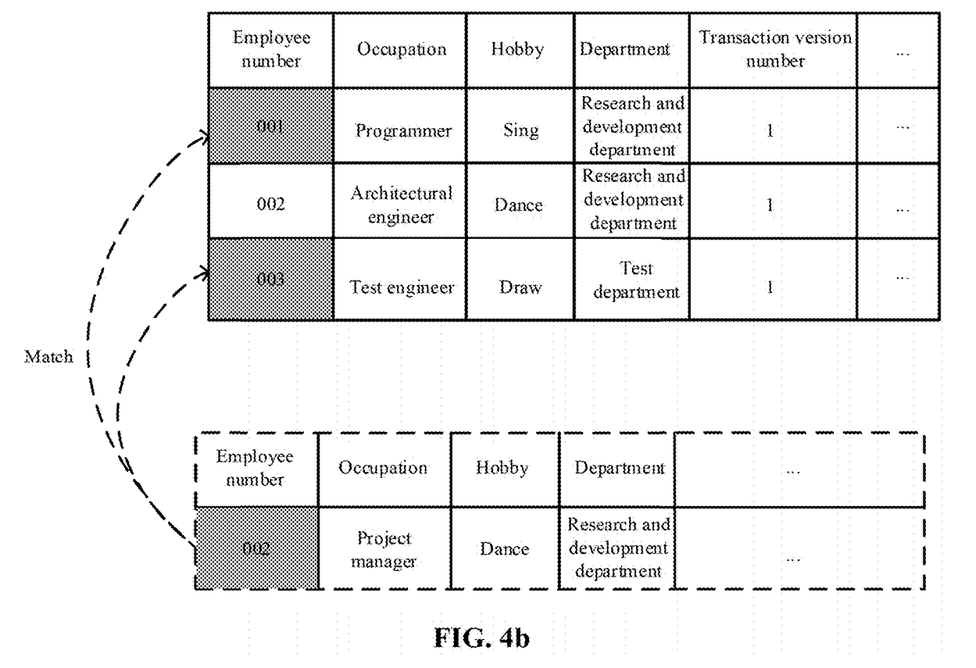
FIG. 4b is a schematic diagram 2 illustrating a matching process of a target field value.

Further, the modified target data record shown in FIG. 3c is used as an example. "Employee number" in the target data record can be matched with "employee number" in each of the $1^{st}$ row of data record and the $3^{rd}$ row of data record shown in FIG. 3a in a one-to-one manner. It is worthwhile to note that because the target data record is obtained by modifying the $2^{nd}$ row of data record in FIG. 3a, the target data record does not need to be compared with the row of data record. A specific matching process can be shown in FIG. 4b. In FIG. 4b, the constraint relationship check succeeds because matching with "employee number" in both of the $1^{st}$ row of data record and the $3^{rd}$ row of data record shown in FIG. 3a fails.

In addition, when the constraint relationship is a foreign key constraint, the performing the constraint relationship check on the target field value corresponding to the target field in the target data record includes: matching the target field value with each field value corresponding to the target field in each related data record in the child table of the target data table if the DML operation of the first transaction is a deletion operation, where the constraint relationship check succeeds if matching with all the field values fails; or the constraint relationship check fails otherwise; or It should be understood that, a matching process of the field value is determining whether the target field value is referenced in the child table, and if the target field value is referenced in the child table, the constraint relationship check performed on the target field value fails.

The target field value is matched with each field value corresponding to the target field in each related data record in the parent table of the target data table if the DML operation of the first transaction is an addition operation or a modification operation, where the constraint relationship check succeeds if the target field value is successfully matched with any field value; or the constraint relationship check fails otherwise.

Figure 4C:
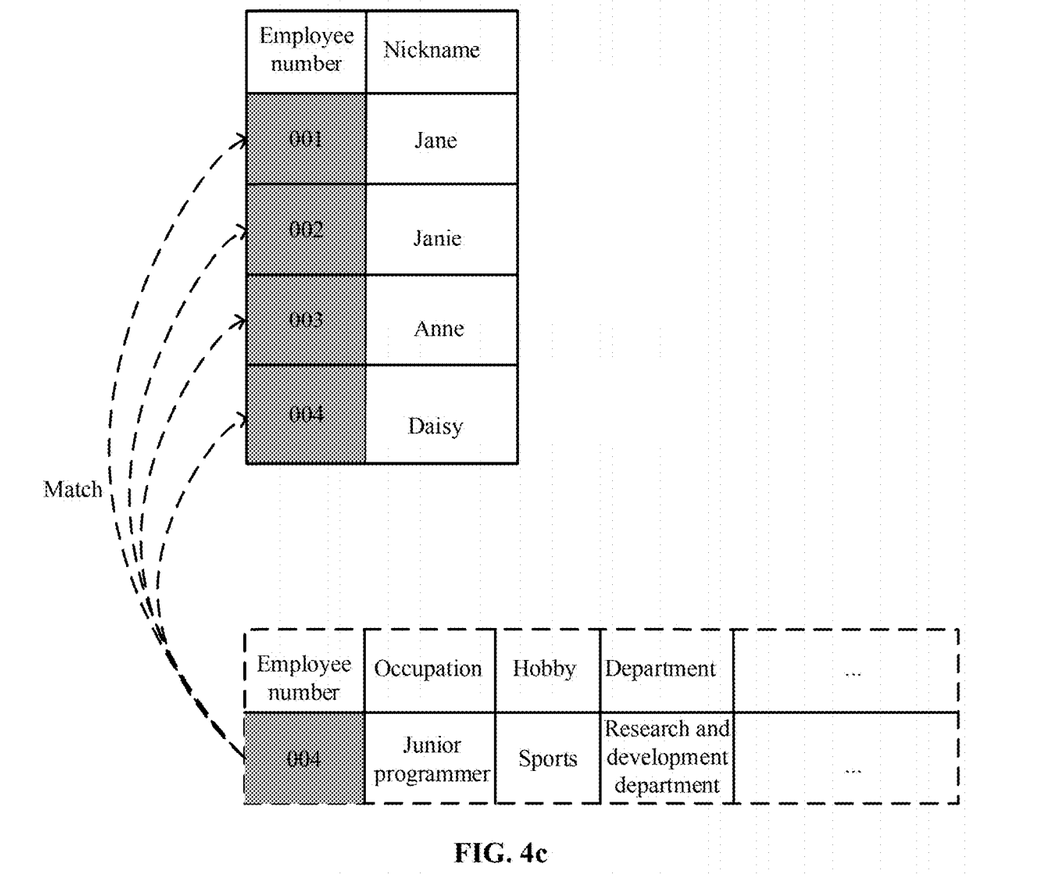
FIG. 4c is a schematic diagram 3 illustrating a matching process of a target field value.

The newly added target data record shown in FIG. 3b and the parent table shown in FIG. 3d are used as an example. "Employee number" in the target data record can be matched with "employee number" in each of the four rows of data records shown in FIG. 3d in a one-to-one manner. A specific matching process can be shown in FIG. 4c. In FIG. 4c, the constraint relationship check succeeds because "employee number" in the target data record is successfully matched with "employee number" in the $2^{nd}$ row.

Step 210: Submit the first transaction if the constraint relationship check succeeds; or roll back the first transaction otherwise.

It should be understood that, after the first transaction is successfully submitted, the target data record can be stored in the target data table of the database. Specifically, the current transaction version number can be added to the target data record, to obtain an updated target data record. The updated target data record is stored in the target data table.

In conclusion, in the constraint relationship check method for a database provided in the one or more embodiments of this specification, each data record in the database has a transaction version number, and a value of the transaction version number indicates a sequence of submitting a transaction of operating the corresponding data record. After the DML operation is performed on the database, the latest related data record visible to a current transaction is selected for a constraint relationship check based on a currently determined transaction version number. Therefore, in this solution, validity of constraint relationship detection can be ensured without locking the related data record, to avoid affecting performance of the database.

Figure 5:
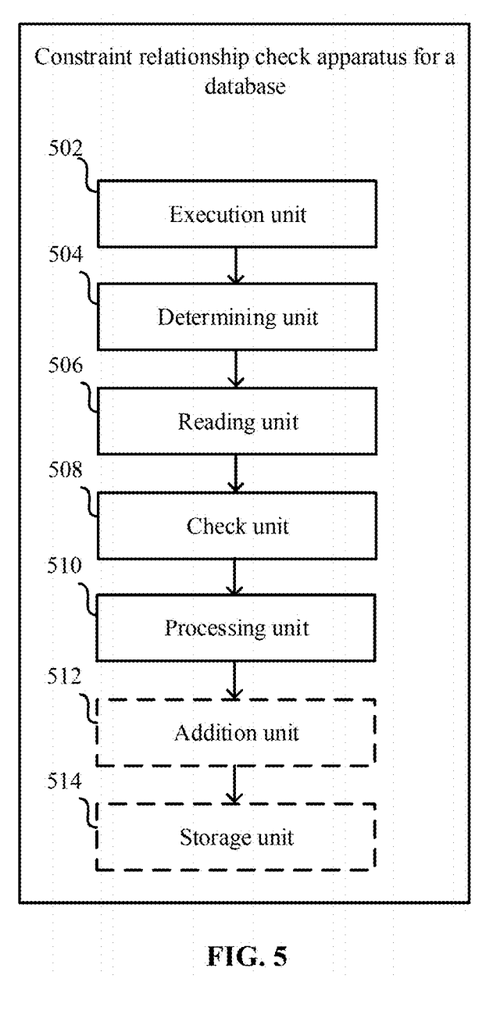
FIG. 5 is a schematic diagram illustrating a constraint relationship check apparatus for a database, according to one or more embodiments.

Corresponding to the constraint relationship check method for a database, one or more embodiments of this specification further provide a constraint relationship check apparatus for a database. As shown in FIG. 5, the apparatus can include the following units.

An execution unit 502 is configured to perform a DML operation of a first transaction for a target data table in the database. Each data record stored in each data table in the database has a transaction version number.

The DML operation includes one of the following: an addition operation, a modification operation, and a deletion operation.

A determining unit 504 is configured to enter a submission stage, and determine a corresponding current transaction version number for a target data record obtained after the DML operation in the submission stage.

The determining unit 504 is specifically configured to determine a globally ordered transaction ID of the first transaction as the current transaction version number.

A reading unit 506 is configured to read each latest related data record visible to the first transaction from the target data table or an associated data table of the target data table based on the current transaction version number. There is a mutual limitation relationship between field values corresponding to a target field in the target data record and each related data record.

The constraint relationship is a unique constraint or a primary key constraint.

The reading unit 506 is specifically configured to read, from the target data table as each related data record, each latest data record whose corresponding transaction version number is less than or equal to the current transaction version number.

The constraint relationship is a foreign key constraint.

The reading unit 506 is specifically configured to read, from the associated data table of the target data table as each related data record, each latest data record whose corresponding transaction version number is less than or equal to the current transaction version number.

The associated data table is a child table of the target data table if the DML operation of the first transaction is a deletion operation; or the associated data table is a parent table of the target data table if the DML operation of the first transaction is an addition operation or a modification operation.

A checking unit 508 is configured to perform a constraint relationship check on a target field value corresponding to the target field in the target data record based on each related data record.

The constraint relationship is a unique constraint or a primary key constraint. The check unit 508 is specifically configured to match the target field value with each field value corresponding to the target field in each related data record in the target data table, where the constraint relationship check succeeds if matching with all the field values fails; or the constraint relationship check fails otherwise.

The constraint relationship is a foreign key constraint. The check unit 508 is specifically configured to: match the target field value with each field value corresponding to the target field in each related data record in the child table of the target data table if the DML operation of the first transaction is a deletion operation, where the constraint relationship check succeeds if matching with all the field values fails; or the constraint relationship check fails otherwise; or match the target field value with each field value corresponding to the target field in each related data record in a parent table of the target data table if the DML operation of the first transaction is an addition operation or a modification operation, where the constraint relationship check succeeds if the target field value is successfully matched with any field value; or the constraint relationship check fails otherwise.

A processing unit 510 is configured to: submit the first transaction if the constraint relationship check succeeds; or roll back the first transaction otherwise.

Optionally, the apparatus can further include: an addition unit 512, configured to add the current transaction version number to the target data record if the constraint relationship check succeeds, to obtain an updated target data record; and a storage unit 514, configured to store the updated target data record in the target data table.

Optionally, when a check occasion of the constraint relationship is an immediate check, the check unit 508 is further configured to immediately perform the constraint relationship check on the target field value corresponding to the target field in the target data record before the submission stage is entered.

The functions of the functional modules of the apparatus in the embodiments of this specification can be implemented by using the steps in the method embodiments. Therefore, a specific working process of the apparatus provided in one or more embodiments of this specification is omitted here for simplicity.

The constraint relationship check apparatus for a database provided in one or more embodiments of this specification can check a constraint relationship of the database without affecting performance of the database.

According to some embodiments of another aspect, a computer-readable storage medium is further provided. The computer-readable storage medium stores a computer program, and when the computer program is executed in a computer, the computer is enabled to perform the method described with reference to FIG. 2.

According to some embodiments of still another aspect, a computing device is further provided, including a memory and a processor. The memory stores executable code, and when the processor executes the executable code, the method described with reference to FIG. 2 is implemented.

The embodiments of this specification are described in a progressive way. For same or similar parts in the embodiments, references can be made to each other. Each embodiment focuses on a difference from another embodiment. Particularly, some device embodiments are briefly described because the device embodiments are basically similar to the method embodiments. For related parts, references can be made to related descriptions in the method embodiments.

Method or algorithm steps described with reference to the content disclosed in this specification can be implemented by hardware, or can be implemented by the processor by executing a software instruction. The software instruction can include a corresponding software module. The software module can be stored in a RAM memory, a flash memory, a ROM memory, an EPROM memory, an EEPROM memory, a register, a hard disk, a removable hard disk, a CD-ROM, or any other form of storage medium well-known in the art. An example storage medium is coupled to the processor, so that the processor can read information from the storage medium and can write information to the storage medium. Certainly, the storage medium can be a component of the processor. The processor and the storage medium can be disposed in an ASIC. In addition, the ASIC can be located in a server. Certainly, the processor and the storage medium can alternatively exist in the server as discrete components.

A person skilled in the art should be aware that, in the previously described one or more examples, functions described in the present application can be implemented by hardware, software, firmware, or any combination thereof. When the functions are implemented by software, the above-mentioned functions can be stored in a computer-readable medium or transmitted as one or more instructions or code in the computer-readable medium. The computer-readable medium includes a computer storage medium and a communication medium. The communication medium includes any medium that enables a computer program to be transmitted from one place to another place. The storage medium can be any usable medium accessible to a general-purpose or special-purpose computer.

Specific embodiments of this specification are described above. Other embodiments fall within the scope of the appended claims. In some cases, the actions or steps described in the claims can be performed in an order different from that in the embodiments, and the desired results can still be achieved. In addition, the process depicted in the accompanying drawings does not necessarily need a particular sequence or consecutive sequence to achieve the desired results. In some implementations, multi-tasking and concurrent processing are feasible or may be advantageous.

The objectives, technical solutions, and beneficial effects of this specification are further described in detail in the above-mentioned specific implementations. It should be understood that the above-mentioned descriptions are merely some specific implementations of this specification, but are not intended to limit the protection scope of this specification. Any modification, equivalent replacement, or improvement made based on the technical solutions in this specification shall fall within the protection scope of this specification.

What is claimed is:

1. A computer-implemented method for a database constraint relationship check, comprising:
    performing a data manipulation language (DML) operation of a first transaction for a target data table in a database, wherein each data record stored in each data table in the database has a transaction version number;
    entering a submission stage;
    determining a corresponding current transaction version number for a target data record obtained after the DML operation in the submission stage;

reading each latest related data record visible to the first transaction from the target data table or an associated data table of the target data table based on the corresponding current transaction version number, wherein there is a mutual limitation relationship between field values corresponding to a target field in the target data record and each related data record;

performing a constraint relationship check on a target field value corresponding to the target field in the target data record based on each related data record; and submitting the first transaction if the constraint relationship check succeeds or rolling back the first transaction otherwise.

2. The computer-implemented method of claim 1, wherein:
the DML operation comprises one of: an addition operation, a modification operation, and a deletion operation.

3. The computer-implemented method of claim 1, wherein:
a constraint relationship is a unique constraint or a primary key constraint; and
the reading each latest related data record visible to the first transaction, comprises:
reading, from the target data table as the related data record, each latest data record, wherein a corresponding transaction version number of each latest data record is less than or equal to a current transaction version number.

4. The computer-implemented method of claim 1, wherein:
a constraint relationship is a foreign key constraint; and
the reading each latest related data record visible to the first transaction, comprises:
reading, from the associated data table of the target data table as the related data record, each latest data record, wherein a corresponding transaction version number of each latest data record is less than or equal to a current transaction version number.

5. The computer-implemented method of claim 4, wherein:
the associated data table is a child table of the target data table if the DML operation is a deletion operation; or
the associated data table is a parent table of the target data table if the DML operation is an addition operation or a modification operation.

6. The computer-implemented method of claim 1, wherein:
a constraint relationship is a unique constraint or a primary key constraint; and
the performing a constraint relationship check on a target field value corresponding to the target field in the target data record, comprises:
matching the target field value with each field value corresponding to the target field in each related data record in the target data table, wherein the constraint relationship check succeeds if matching with all the field values fails; or the constraint relationship check fails otherwise.

7. The computer-implemented method of claim 1, wherein:
a constraint relationship is a foreign key constraint; and
the performing a constraint relationship check on a target field value corresponding to the target field in the target data record, comprises:
matching the target field value with each field value corresponding to the target field in each related data record in a child table of the target data table if the DML operation is a deletion operation, wherein the constraint relationship check succeeds if matching with all the field values fails; or the constraint relationship check fails otherwise; or
matching the target field value with each field value corresponding to the target field in each related data record in a parent table of the target data table if the DML operation is an addition operation or a modification operation, wherein the constraint relationship check succeeds if the target field value is successfully matched with any field value; or the constraint relationship check fails otherwise.

8. The computer-implemented method of claim 1, wherein:
the determining a corresponding current transaction version number, comprises:
determining a globally ordered transaction ID of the first transaction as the current corresponding transaction version number.

9. The computer-implemented method of claim 1, wherein:
the DML operation is an addition operation or a modification operation, and comprising:
adding the current corresponding transaction version number to the target data record if the constraint relationship check succeeds, to obtain an updated target data record; and
storing the updated target data record in the target data table.

10. The computer-implemented method of claim 1, wherein:
a check occasion of a constraint relationship is an immediate check; and
comprising:
immediately performing the constraint relationship check on the target field value corresponding to the target field in the target data record before the submission stage is entered.

11. A non-transitory, computer-readable medium storing one or more instructions executable by a computer system to perform one or more operations for a database constraint relationship check, comprising:
performing a data manipulation language (DML) operation of a first transaction for a target data table in a database, wherein each data record stored in each data table in the database has a transaction version number;
entering a submission stage;
determining a corresponding current transaction version number for a target data record obtained after the DML operation in the submission stage;
reading each latest related data record visible to the first transaction from the target data table or an associated data table of the target data table based on the corresponding current transaction version number, wherein there is a mutual limitation relationship between field values corresponding to a target field in the target data record and each related data record;
performing a constraint relationship check on a target field value corresponding to the target field in the target data record based on each related data record; and
submitting the first transaction if the constraint relationship check succeeds or rolling back the first transaction otherwise.

12. The non-transitory, computer-readable medium of claim 11, wherein:
the DML operation comprises one of: an addition operation, a modification operation, and a deletion operation.

13. The non-transitory, computer-readable medium of claim 11, wherein:
a constraint relationship is a unique constraint or a primary key constraint; and
the reading each latest related data record visible to the first transaction, comprises:
reading, from the target data table as the related data record, each latest data record, wherein a corresponding transaction version number of each latest data record is less than or equal to a current transaction version number.

14. The non-transitory, computer-readable medium of claim 11, wherein:
a constraint relationship is a foreign key constraint; and
the reading each latest related data record visible to the first transaction, comprises:
reading, from the associated data table of the target data table as the related data record, each latest data record, wherein a corresponding transaction version number of each latest data record is less than or equal to a current transaction version number.

15. The non-transitory, computer-readable medium of claim 14, wherein:
the associated data table is a child table of the target data table if the DML operation is a deletion operation; or
the associated data table is a parent table of the target data table if the DML operation is an addition operation or a modification operation.

16. The non-transitory, computer-readable medium of claim 11, wherein:
a constraint relationship is a unique constraint or a primary key constraint; and
the performing a constraint relationship check on a target field value corresponding to the target field in the target data record, comprises:
matching the target field value with each field value corresponding to the target field in each related data record in the target data table, wherein the constraint relationship check succeeds if matching with all the field values fails; or the constraint relationship check fails otherwise.

17. The non-transitory, computer-readable medium of claim 11, wherein:
a constraint relationship is a foreign key constraint; and
the performing a constraint relationship check on a target field value corresponding to the target field in the target data record, comprises:
matching the target field value with each field value corresponding to the target field in each related data record in a child table of the target data table if the DML operation is a deletion operation, wherein the constraint relationship check succeeds if matching with all the field values fails; or the constraint relationship check fails otherwise; or
matching the target field value with each field value corresponding to the target field in each related data record in a parent table of the target data table if the DML operation is an addition operation or a modification operation, wherein the constraint relationship check succeeds if the target field value is successfully matched with any field value; or the constraint relationship check fails otherwise.

18. The non-transitory, computer-readable medium of claim 11, wherein:
the determining a corresponding current transaction version number, comprises:
determining a globally ordered transaction ID of the first transaction as the current corresponding transaction version number.

19. The non-transitory, computer-readable medium of claim 11, wherein:
the DML operation is an addition operation or a modification operation, and
comprising:
adding the current corresponding transaction version number to the target data record if the constraint relationship check succeeds, to obtain an updated target data record; and
storing the updated target data record in the target data table.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for a database constraint relationship check, comprising:
performing a data manipulation language (DML) operation of a first transaction for a target data table in a database, wherein each data record stored in each data table in the database has a transaction version number;
entering a submission stage;
determining a corresponding current transaction version number for a target data record obtained after the DML operation in the submission stage;
reading each latest related data record visible to the first transaction from the target data table or an associated data table of the target data table based on the corresponding current transaction version number, wherein there is a mutual limitation relationship between field values corresponding to a target field in the target data record and each related data record;
performing a constraint relationship check on a target field value corresponding to the target field in the target data record based on each related data record; and
submitting the first transaction if the constraint relationship check succeeds or rolling back the first transaction otherwise.

* * * * *